(12) United States Patent
Hino (10) Patent No.: US 7,185,347 B2
(45) Date of Patent: Feb. 27, 2007

(54) SHUTTER DEVICE

(75) Inventor: Kenji Hino, Saitama (JP)

(73) Assignee: Pioneer Corporation, Tokyo (JP)

( * ) Notice: Subject to any disclaimer, the term of this patent is extended or adjusted under 35 U.S.C. 154(b) by 429 days.

(21) Appl. No.: 10/822,792

(22) Filed: Apr. 13, 2004

(65) Prior Publication Data

US 2004/0205791 A1    Oct. 14, 2004

(30) Foreign Application Priority Data

Apr. 14, 2003    (JP)    ............................ P2003-109661

(51) Int. Cl.
*G11B 33/02*    (2006.01)
(52) U.S. Cl. ..................................... 720/647
(58) Field of Classification Search ................ 720/647, 720/619, 617, 632, 643, 644, 600, 601, 622, 720/624, 626, 627, 630; 369/75.11, 75.21, 369/77.11, 77.21
See application file for complete search history.

(56) References Cited

U.S. PATENT DOCUMENTS

| | | | |
|---|---|---|---|
| 4,675,858 A | 6/1987 | D'Alyer de Costemore d'Arc | |
| 5,300,763 A * | 4/1994 | Ito et al. | 235/475 |
| 5,355,358 A | 10/1994 | Van Alfen | |
| 5,748,595 A | 5/1998 | Nakajima | |
| 2001/0001606 A1 | 5/2001 | Horie | |
| 2003/0063550 A1* | 4/2003 | Akatani | 369/77.1 |
| 2005/0193401 A1* | 9/2005 | Lin et al. | 720/624 |
| 2006/0059499 A1* | 3/2006 | Huang | 720/624 |

FOREIGN PATENT DOCUMENTS

JP    10-255367 A    9/1998

\* cited by examiner

*Primary Examiner*—Allen Cao
(74) *Attorney, Agent, or Firm*—Sughrue Mion, PLLC (57) ABSTRACT

A shutter device includes a shutter member which rotates about a first rotational axis and a swinging arm for the shutter member by engaging the shutter member. The shutter member has an insertion preventing portion which, by being rotated by the swinging arm rotating about a second rotational axis, is positioned at a preventing position for preventing the insertion of a recording medium by covering at least a portion of an opening for inserting the recording medium and at an open position enabling the insertion and ejection of the recording medium by opening the opening. Engaging portions of the shutter member and the swinging arm are provided between the first rotational axis and the position of the insertion preventing portion in the shutter member.

4 Claims, 11 Drawing Sheets

SHUTTER DEVICE

BACKGROUND OF THE INVENTION

1. Title of the Invention

The present invention relates to a shutter device in a recording/reproducing apparatus or the like.

2. Description of the Related Art

Conventionally, a recording/reproducing apparatus for effecting the recording of data in a card-shaped recording medium such as an optical memory card or a magnetic card or a disk-shaped recording medium such as a CD or a DVD or the reproduction of data recorded in that recording medium is provided with a shutter device for closing an opening after the insertion of the recording medium to prevent the double loading of such a recording medium (e.g., refer to JP-A-10-255367).

Figure 1:
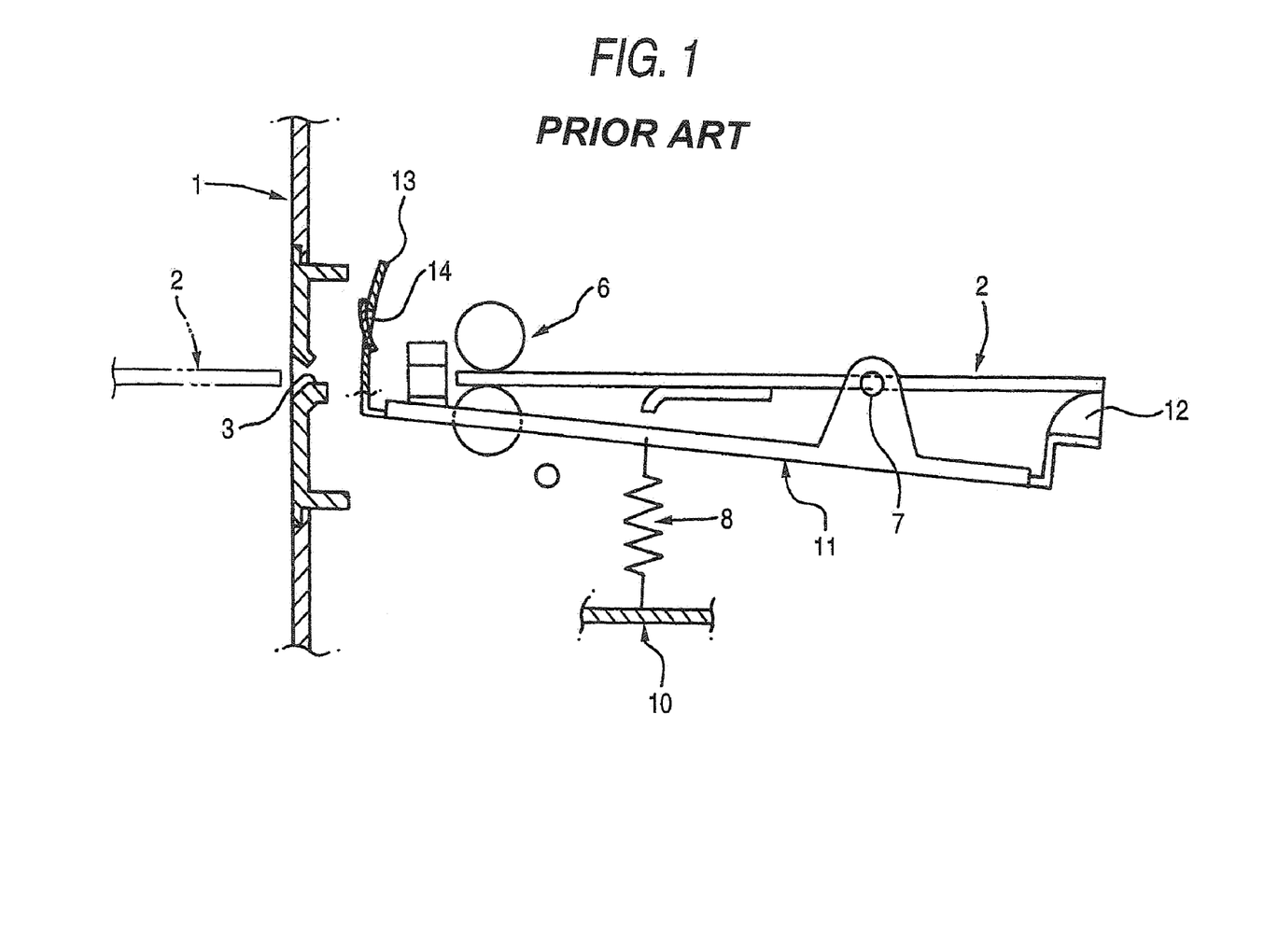
FIG. 1 is a vertical cross-sectional view for explaining a conventional shutter device.

The conventional shutter device shown in FIG. 1 is an example in which the shutter device is applied to a recording/reproducing apparatus using a card-shaped recording medium.

A horizontally elongated insertion port 3, into which a recording medium 2 is ejectably inserted, is formed in a front surface of a panel 1.

Disposed in the rear of the panel 1 (in the interior of the panel 1) is a transporting device 6 for transporting to a recording/reproducing position the recording medium 2 inserted through the insertion port (opening) 3, and for discharging the recording medium 2 at the recording/reproducing position forwardly from the panel 1 through the insertion port 3 after completion of recording/reproduction.

A shutter 13 is provided uprightly at a front end of a holding member 11 which is formed in the shape of an elongated frame extending in the inserting direction (in the left-and-right direction in FIG. 1) of the recording medium 2 and which is rotatable about a supporting shaft 7. The shutter 13 is disposed in the vicinity of the inner side of the panel 1 and is located in front of the transporting device 6. This shutter 13 is formed of a plate having a forwardly curved convex shape, and a horizontally elongated opening 14 having a shape and a size corresponding to the insertion port 3 is formed in its central portion.

As the holding member 11 is rotated, the shutter 13 moves in a substantially vertical direction which is substantially parallel to the panel 1. The Shutter 13 is capable of changing its position between an open position in which the opening 14 corresponds to the insertion port 3 and a closed position (the position shown in FIG. 1) in which the shutter 13, after upwardly moving from the open position, closes the insertion port 3 by its lower side portion.

This holding member 11 is rotated as an actuating member 12 provided uprightly at its rear end is pressed by the recording medium 2 during the transport of the recording medium 2 to the recording/reproducing position by the transporting device 6. The holding member 11 thereby moves the shutter 13 to the closed position shown in FIG. 1. This holding member 11 urges the shutter 13 toward the open position side as its front end portion is urged downward by an urging spring 8 interposed between the holding member 11 and a chassis 10.

Accordingly, the shutter 13 provided uprightly on the front end of the holding member 11 which is rotatable around a supporting shaft 16 is moved in the substantially vertical direction substantially parallel to the panel 1. Consequently, the back-and-forth length of the space for the operation of the shutter 13 is made short, thereby making it possible to make the overall recording/reproducing apparatus compact.

However, in the case of the shutter device in which the insertion port 3 is closed by the shutter 13 provided uprightly at the front end of the rotatable holding member 11, in making the recording/reproducing apparatus still thinner, if the amount of rotation of the holding member 11 becomes small, the amount of movement of the shutter 13 which moves between the open position and the closed position also becomes small. For that reason, it is necessary to secure the amount of rotation of the holding member 11 in order to cause the shutter 13 to retreat to a position sufficiently spaced apart from an inserting/ejecting passage of the recording medium. Hence, there arises the problem that the restriction in space is large in making the recording/reproducing apparatus thin. It is possible to cite the above-described problem as one example.

SUMMARY OF THE INVENTION

It is an object of the invention to provide a shutter device including: a shutter member which rotates around a rotational axis; and a driving member for driving the shutter member by engaging the shutter member, wherein the shutter member has an insertion preventing portion capable of being rotated by the driving member, the insertion preventing portion is positioned at a preventing position where the insertion preventing portion prevents an insertion of a recording medium by covering at least a part of an opening portion for inserting or ejecting the recording medium, the insertion preventing portion is positioned at a opening position where the insertion preventing portion is capable of inserting and ejecting the recording medium by opening the opening portion, and an engaging portion of the shutter member and the driving member is between the preventing position of the insertion preventing portion and a symmetrical position with the position of said insertion preventing portion with respect to the rotational axis.

According to first aspect of the invention, a shutter device including: a shutter member which rotates around a rotational axis; and a driving member for driving the shutter member by engaging the shutter member, wherein the shutter member has an insertion preventing portion capable of being rotated by the driving member, the insertion preventing portion is positioned at a preventing position where the insertion preventing portion prevents an insertion of a recording medium by covering at least a part of an opening portion for inserting or ejecting the recording medium, the insertion preventing portion is positioned at a opening position where the insertion preventing portion is capable of inserting and ejecting the recording medium by opening the opening portion, and an engaging portion of the shutter member and the driving member is between the preventing position of the insertion preventing portion and a symmetrical position with the position of said insertion preventing portion with respect to the rotational axis.

Namely, the engaging portions are between the position of the insertion preventing portion in the shutter member and a position which becomes symmetrical with the position of the insertion preventing portion with respect to the first rotational axis. It is possible to save a space in the vicinity of the driving member by making small the amount of movement of the driving member with respect to the amount of movement of the insertion preventing portion of the shutter member by the principle of the lever. It is thereby possible to realize a compact size of the recording/reproducing apparatus.

Furthermore, if the engaging portion is provided in the vicinity of the first rotational axis, the amount of movement of the driving member can be made smaller than the amount of movement of the insertion preventing portion. Hence, the recording/reproducing apparatus can be made and thin.

In addition, if the engaging portion is provided between the first rotational axis O and the insertion preventing portion, the shutter member can be made small. At the same time, the moving directions in which the driving member moves and the insertion preventing portion moves can be set in the same direction, thereby making it possible to make the recording/reproducing apparatus compact and thin.

In addition, if the shutter member is provided in the vicinity of the opening, and the first rotational axis is provided along the inserting direction of the recording medium, it is possible to attain space saving of the movable space of the shutter member in the inserting direction of the recording medium.

In addition, the driving member rotates about a second rotational axis, and engages at its first end portion with the shutter member.

As a result, the movable space of the driving member can be saved as the driving member is rotated, and the driving member can be made compact as its end portion is engaged.

In addition, in the shutter device in accordance with the invention, the driving member has a transporting member for effecting the insertion or ejection by abutting against the recording medium, and the insertion preventing portion moves to the preventing position from the open position, while the transporting member moves away from the recording medium. Namely, it is possible to make common the driving force at the time when the insertion preventing portion moves to the preventing position and the driving force at the time when the transporting member moves away from the recording medium.

In addition, in the case where the driving member rotates about the second rotational axis, and engages at its first end portion with the shutter member, the driving member has the transporting member at its second end portion located on the opposite side to the first end portion with respect to the second rotational axis.

Consequently, in a case where the positions of the opening and the transporting member are predetermined, it is possible to make the driving member compact. In addition, if the second rotational axis is provided close to the engaging portion of the driving member, the amount of movement of the transporting member can be made large with respect to the amount of movement of the engaging portion of the driving member. Accordingly, the amount of movement of the transporting member away from the recording medium can be made large.

In addition, in the shutter device in accordance with the invention, when the insertion preventing portion is located in the open position, a clearance of at least more than an amount of movement at the engaging portion of the driving member which moves as the recording medium and the transporting member abut against each other is present between the engaging portions of the shutter member and the driving member.

Namely, even if the transporting member and the recording medium abut against each other and the driving member moves when the recording medium is inserted, the shutter member does not move in an interlocked manner. Therefore, it is possible to reduce the risk of the insertion preventing portion being unexpectedly moved to the preventing position.

In addition, in the shutter device in accordance with the invention, the shutter member is constantly urged in an opening direction.

Namely, in the case where the insertion preventing portion is positioned at the open position, even if the recording/reproducing apparatus undergoes vibration, it is possible to reduce the risk of the insertion preventing portion being unexpectedly moved to the preventing position. Further, when the insertion preventing portion moves from the preventing position to the open position, the shutter member moves speedily by being interlocked with the driving member, and the insertion preventing portion is able to move to the open position speedily.

DESCRIPTION OF THE PREFERRED EMBODIMENTS

Hereafter, a detailed description will be given of a shutter device in accordance with an embodiment of the invention with reference to the accompanying drawings.

Figure 2:
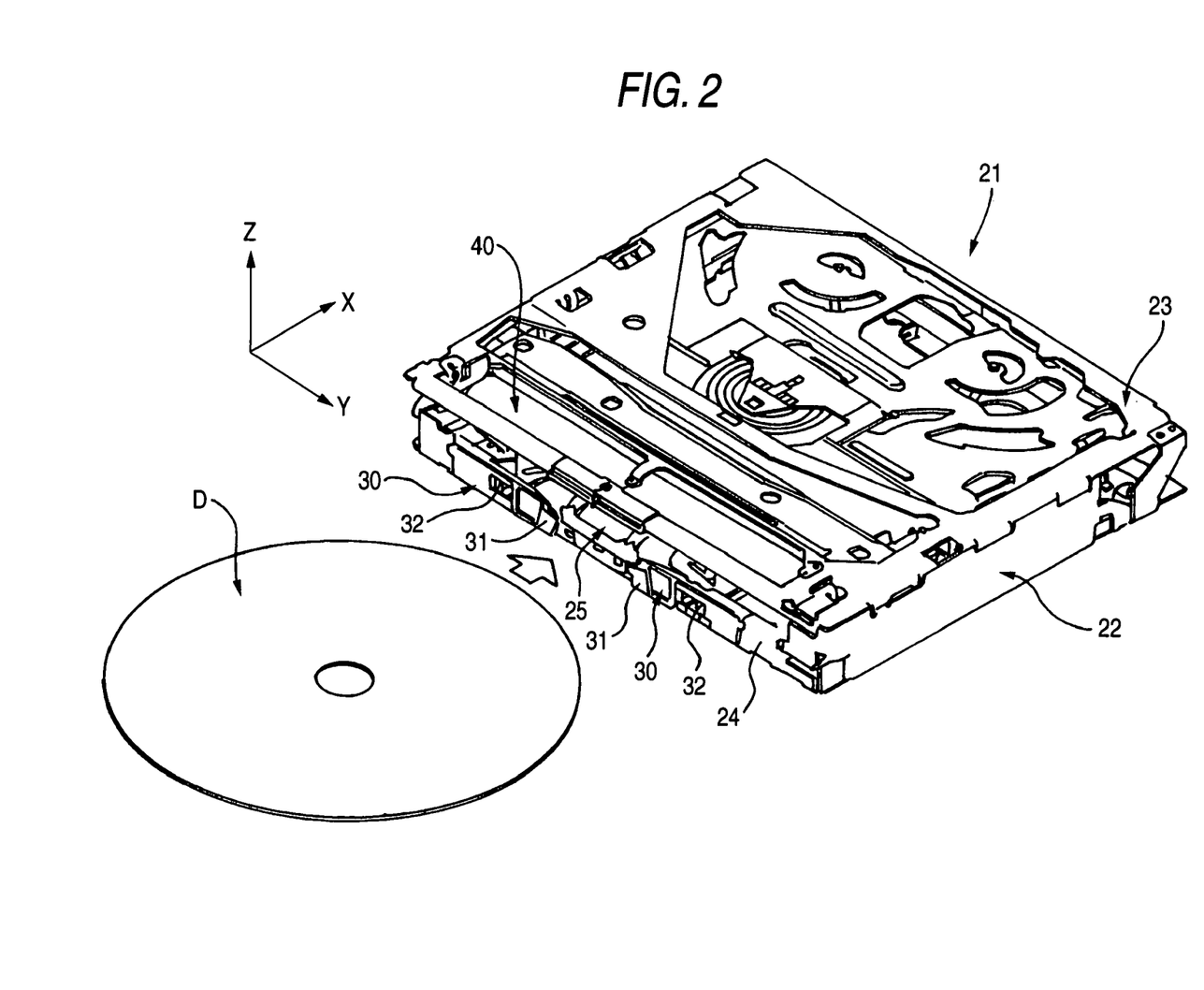
FIG. 2 is an overall perspective view of a recording/reproducing apparatus having a shutter device in accordance with one aspect of the invention.
Figure 3:
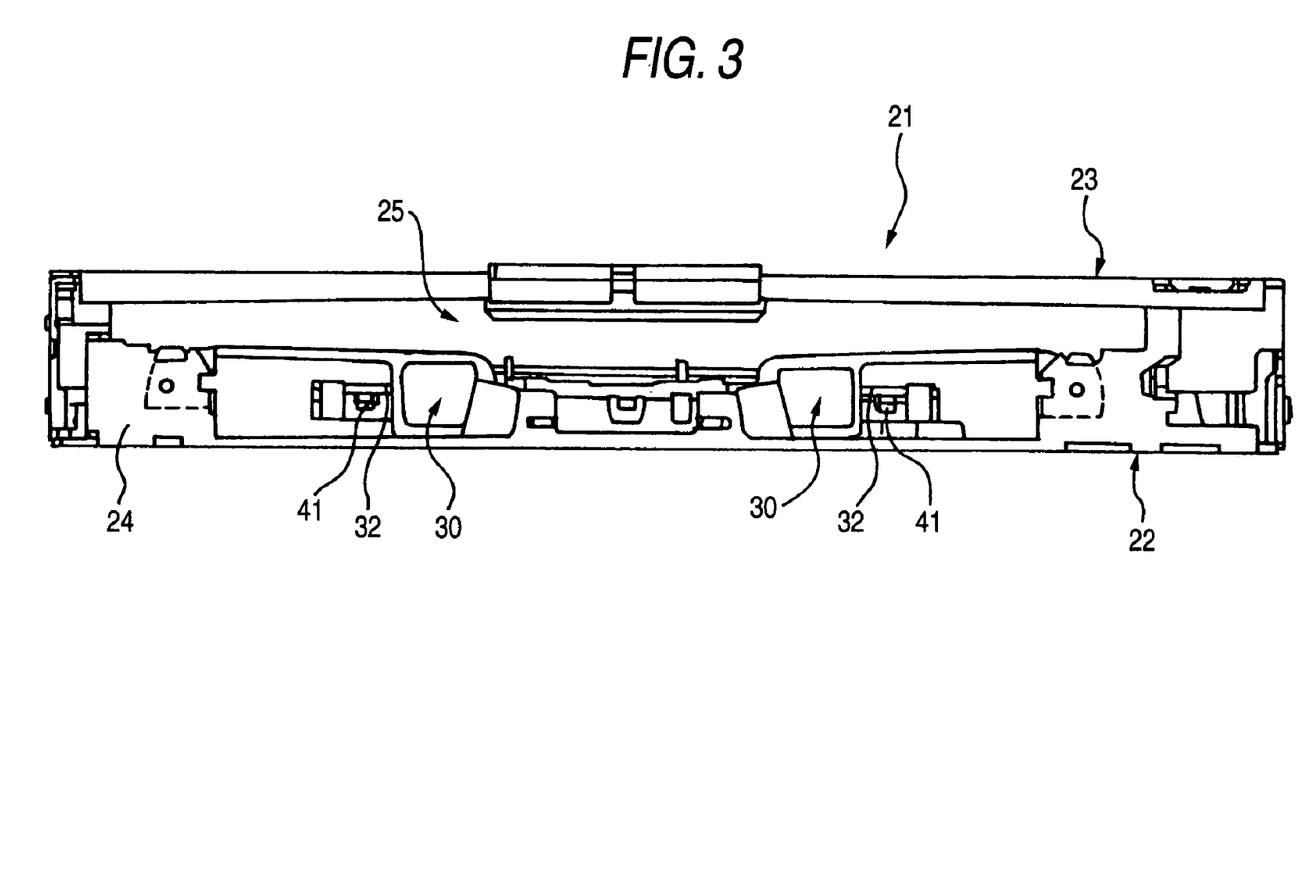
FIG. 3 is a front elevational view of the recording/reproducing apparatus shown in FIG. 2.
Figure 4:
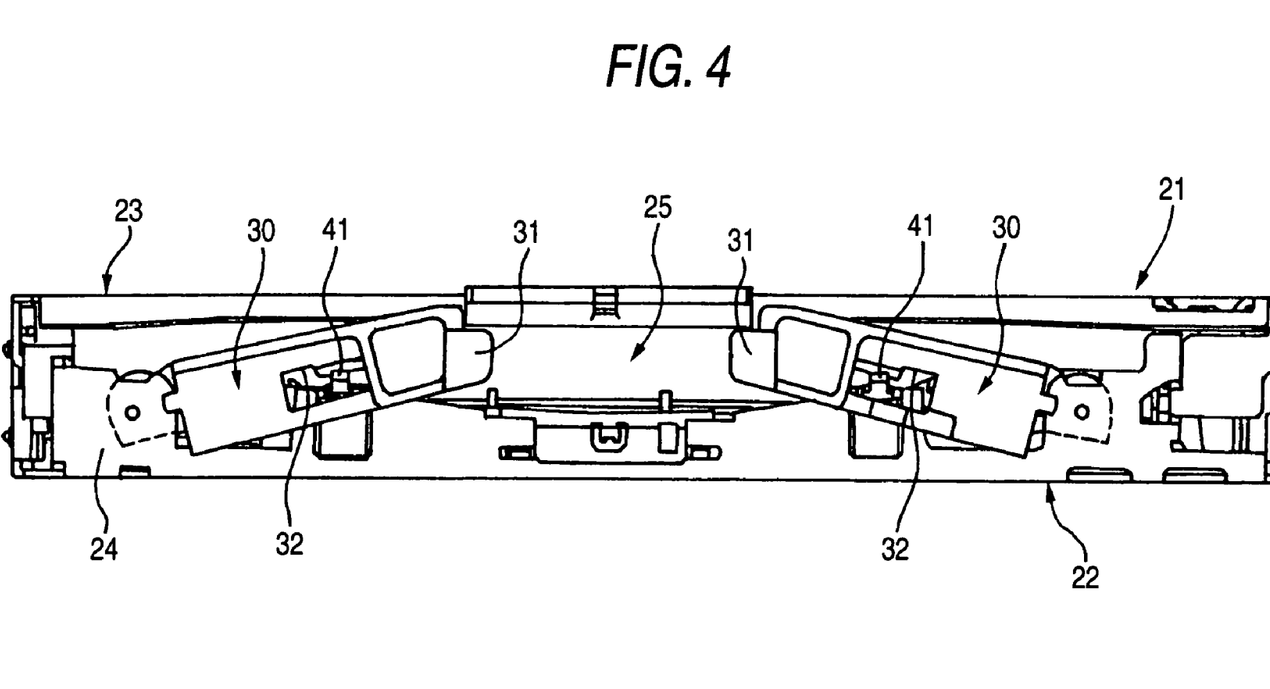
FIG. 4 is a front elevational view of the recording/reproducing apparatus shown in FIG. 2.
Figure 5:
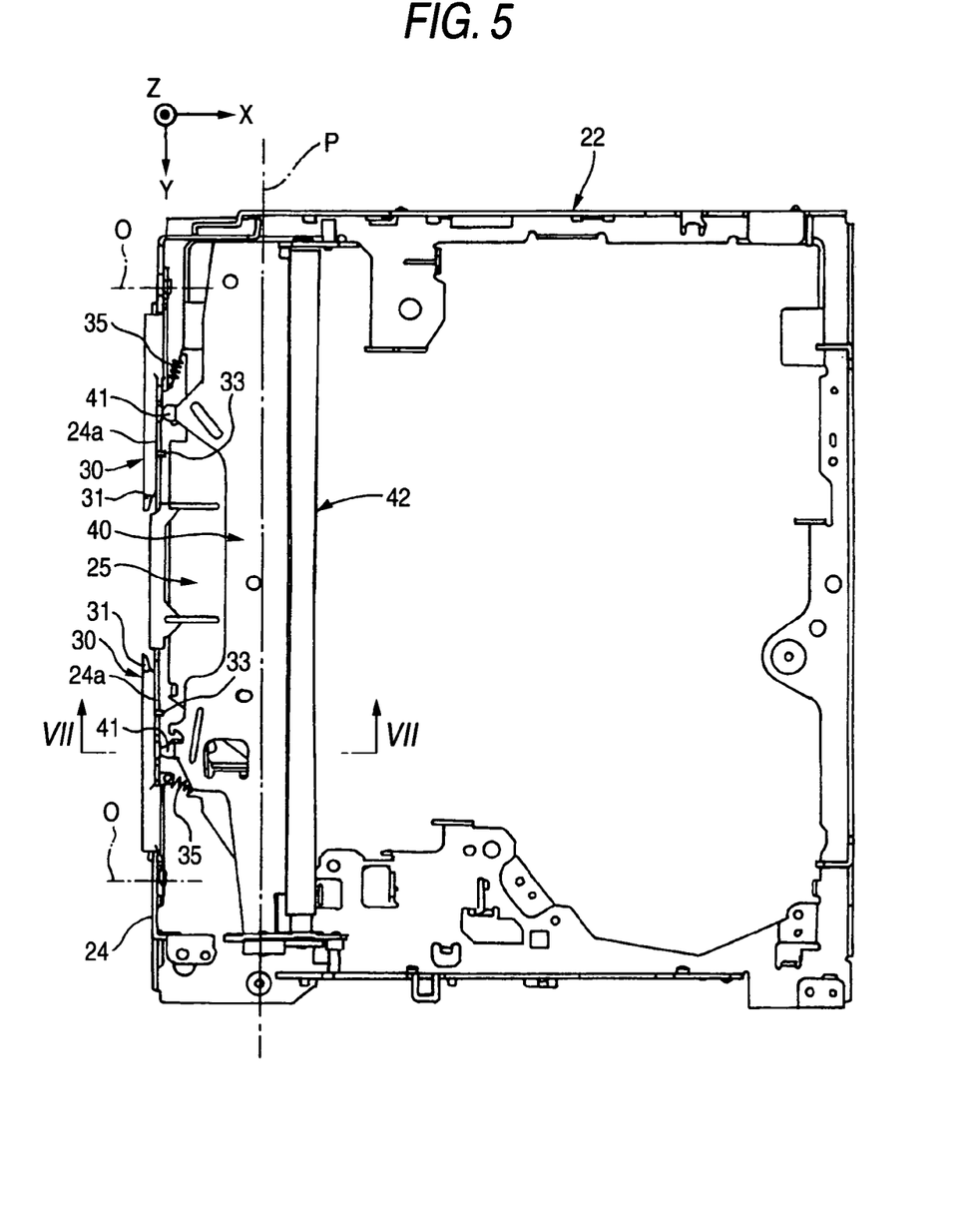
FIG. 5 is a plan view of a chassis portion of the recording/reproducing apparatus shown in FIG. 2.

FIG. 2 is an overall perspective view of a recording/reproducing apparatus having the shutter device in accordance with an embodiment of the invention. FIGS. 3 and 4 are front elevational views of the recording/reproducing apparatus shown in FIG. 2. FIG. 5 is a plan view of a chassis portion of the recording/reproducing apparatus shown in FIG. 2.

In this embodiment, as shown in FIGS. 2 to 4, a recording/reproducing apparatus, which records or reproduces a disk-shaped recording medium such as a CD or a DVD, has a rectangular box-shaped housing 21 formed by a chassis portion 22 and a top plate 23. The recording/reproducing apparatus has an opening 25 for inserting or ejecting a recording medium D in a front surface of the housing 21. The opening 25 is provided in a transversely elongated shape extending along the direction of a Y axis in FIG. 2.

As shown in FIG. 5, a pair of left and right shutter members 30 are disposed on an outer surface of a front panel 24 of the chassis portion 22 located in the vicinity of a lower side of the opening 25, in such a manner as to be respectively rotatable around first rotational axes O along the inserting direction (in the direction of an X axis in FIG. 5) of the recording medium D.

Each of the shutter members 30 is pivotally supported to be respectively rotatable along the outer surface of the front panel 24. Each of the shutter members 30 is a substantially rectangular plate having on its swinging distal end side an insertion preventing portion 31. The insertion preventing portion 31 is movable between a preventing position (the position shown in FIG. 4) for preventing the insertion of the recording medium D by covering at least a portion of the opening 25 and an open position (the position shown in FIG. 3) for permitting the insertion and ejection of the recording medium D by opening the opening 25.

Figure 6:
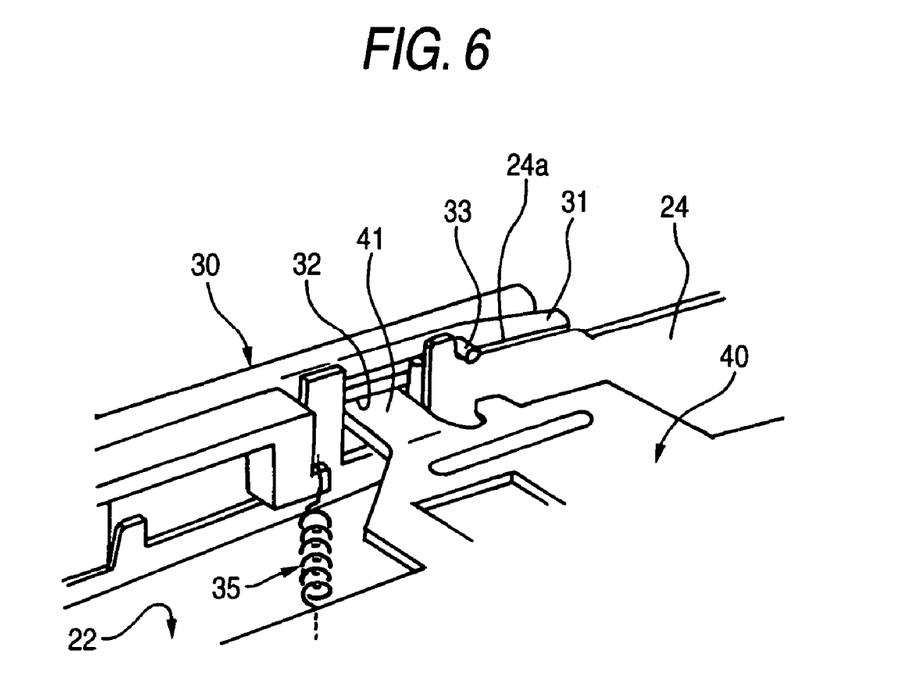
FIG. 6 is an enlarged perspective view of the shutter device shown in FIG. 5.

As shown in FIGS. 5 and 6, the shutter members 30 are respectively urged constantly in the opening direction (in the downward direction in FIG. 6) by urging forces of a pair of springs 35 which is interposed between the shutter member 30 and a bottom wall of the chassis portion 22. The urging force for constantly urging the shutter member 30 in the opening direction is not limited to one which urges by making use of the resiliency of a spring. The shutter member 30 may be urged by any force using such as a method in which a weight is attached to the shutter member 30 to urge it by gravity.

In addition, a retaining pin 33 abuts against an upper edge 24a of the front panel 24 on an inner surface of the shutter member 30 opposing the outer surface of the front panel 24. The retaining pin 33 restricts a rotation of the shutter member 30 in the opening direction.

Further, an engaging opening 32 is formed between the first rotational axis O in each shutter member 30 and the insertion preventing portion 31. A swinging distal end portion 41 of a swinging arm 40 to be described later is inserted and engaged into the engaging opening 32. Each shutter member has an engaging portion for engagement with the swinging arm 40.

In this embodiment, since the engaging portion is between the first rotational axis O and the insertion preventing portion 31, the shutter member 30 can be made small. At the same time, the directions in which the swinging arm 40 moves and the insertion preventing portion 31 moves can be set in the same direction, thereby making it possible to make the recording/reproducing apparatus compact and thin.

Furthermore, as the engaging portion is at a position closer to the first rotational axis O, the amount of movement of the swinging arm 40 can be made smaller than the amount of movement of the insertion preventing portion 31. Hence, the recording/reproducing apparatus can be made further compact and thin.

On the other hand, as shown in FIG. 5, the swinging arm 40 is disposed on a front portion of the chassis portion 22 (front panel 24 side portion). The swinging arm 40 is rotatable around a second rotational axis P parallel to the longitudinal direction of the opening 25 (Y-axis direction).

A first end portion of the swinging arm 40 has the pair of swinging distal end portions 41 respectively corresponding to the engaging openings 32 in the shutter members 30, the swinging distal end portions 41 being respectively inserted in the engaging openings 32.

The pair of shutter members 30 is moved to the preventing position or the open position by being interlocked with the rotation of the swinging arm 40. The swinging arm 40 serves as a driving member driven by an unillustrated drive unit.

The movable space of the swinging arm 40 can be saved as the swinging arm 40 is rotated. The swinging arm 40 can be made compact as its end portions are engaged with the shutter members 30.

Here, the swinging arm 40 assumes a horizontal attitude at the preventing position of the shutter member 30, while the swinging arm 40 assumes a forwardly inclined attitude at the open position of the shutter member 30.

The driving member for driving the shutter member 30 is not limited to the above-described swinging arm 40 which swings in this embodiment. It is possible to use an arm member or the like which moves in parallel.

In addition, an insertion/ejection roller 42 is at a second end portion of the swinging arm 40 located on an opposite side to the swinging distal end portions 41 with respect to the second rotational axis P. The insertion/ejection roller 42 inserts and ejects the recording medium D while the insertion/ejection roller 42 is abutting against the recording medium D.

The insertion/ejection roller 42 is one example of a transporting member. When the insertion/ejection roller 42 is rotated forwardly or reversely by a rotatively driving unit (not shown), while the insertion/ejection roller is pressed and urged against an opposing surface of the recording medium D, the insertion/ejection roller 42 transports the recording medium D inserted in the housing 21 through the opening 25 and loads the recording medium D in a recording/reproducing section (not shown) installed in a rear portion of the chassis portion 22. The insertion/ejection roller 42 ejects the recording medium D, whose recording/reproduction has been finished, to outside the housing 21 through the opening 25.

Next, a description will be given of the operation of the shutter device of this embodiment which is comprised of the shutter members 30 and the swinging arm 40 described above.

Figure 7:
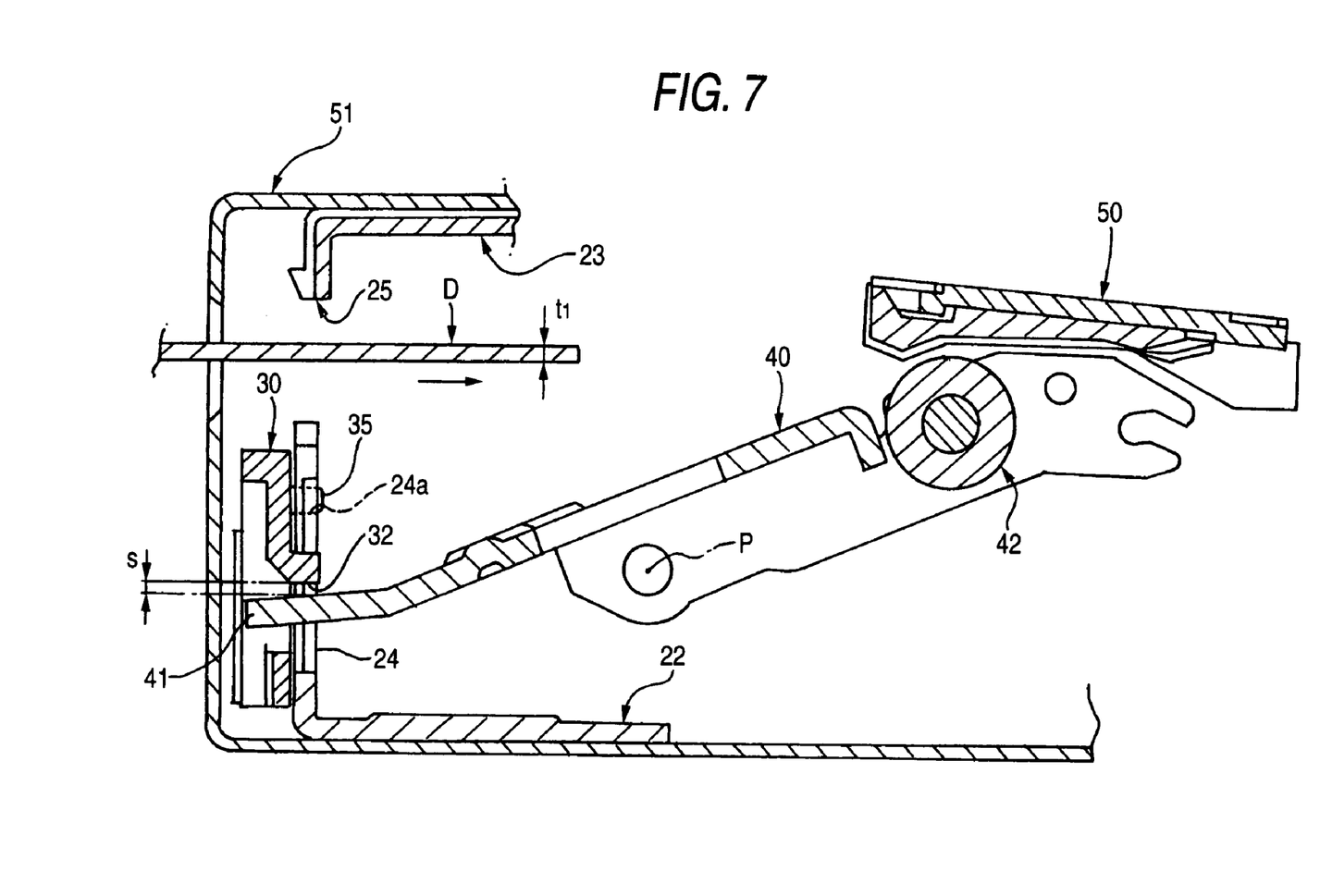
FIG. 7 is a cross-sectional view taken in the direction of arrows along line VII—VII in FIG. 5.

First, before the recording medium D is loaded in the recording/reproducing apparatus, the swinging arm 40 is set in the forwardly inclined attitude, as shown in FIG. 7, by the unillustrated drive unit, so that the shutter members 30 are in the open position. Reference numeral 51 denotes an outer panel for covering the housing 21.

At this time, although the shutter members 30 are constantly urged in the opening direction (in the downward direction in FIGS. 3 and 7) by the resiliency of the springs 35, the retaining pins 33 of the shutter members 30 abut against the upper edge 24a of the front panel 24, so that the shutter members 30 is restricted from rotating in the opening direction and do not rotate further.

When the insertion preventing portion 31 of the shutter members 30 is located in the open position, a clearance S exists between the engaging portions of the shutter member 30 and the swinging arm 40. The clearance S is at least more than an amount of movement t2 at the engaging portion of the swinging arm 40 which moves in correspondence with a thickness t1 of the recording medium D while the insertion/rejection roller 42 abutting against the recording medium D. (See FIGS. 7 and 8).

Figure 8:
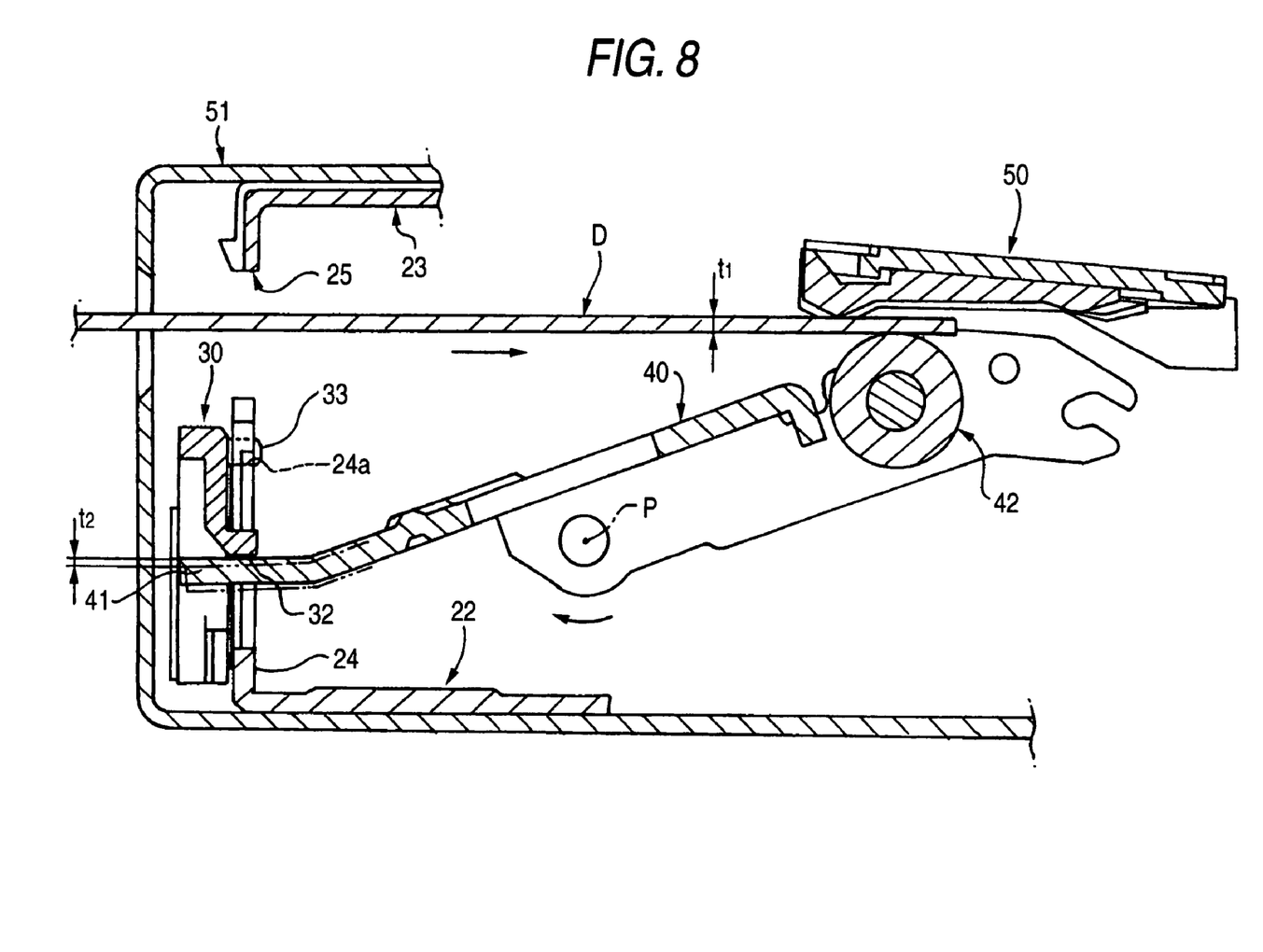
FIG. 8 is a diagram of the state of operation in FIG. 7.

Namely, the swinging distal end portions 41 of the swinging arm 40 inserted in the engaging openings 32 of the shutter members 30 are set to have the clearance S with respect to the upper opening edges of the engaging openings 32. This clearance S is set to be more than the amount of movement t2 at the engaging portion of the swinging arm 40 which moves in correspondence with the thickness t1 of the recording medium D as the recording medium D loaded in the recording/reproducing apparatus and the insertion/rejection roller 42 abut against each other. In a case where the recording/reproducing apparatus is a so-called compatible-type apparatus capable of reproduction or recording with respect to a plurality of kinds of recording media D having different thicknesses t1, the clearance S is set to more than the amount of movement t2 corresponding to the thickness t1 of the recording medium D which is supposed to be the thickest.

The insertion/ejection roller 42 provided at the second end portion of the swinging arm 40 is in a state of being close to a guide member 50 provided on the opposing top plate 23 side, as shown in FIG. 7, since the swinging arm 40 is set in the forwardly inclined state.

In this state, if the recording medium D is inserted through the open opening 25, a leading end of the recording medium D in its inserting direction is inserted between the insertion/rejection roller 42 and the guide member 50, as shown in FIG. 8.

The insertion/rejection roller 42 nips the recording medium D with the guide member 50, when the insertion/rejection roller 42 is rotatively driven by the rotatively driving unit (not shown) in a state in which the insertion/rejection roller 42 is pressed and urged against the opposing surface of the recording medium D. Consequently, the recording medium D is loaded in the recording/reproducing section (not shown) installed in the rear portion of the chassis portion 22.

At this time, the interval between the insertion/rejection roller 42 and the guide member 50 is set to be narrower than the thickness t1 of the recording medium D in order to nip the recording medium D. Therefore, as the inserted recording medium D is brought into contact with the insertion/rejection roller 42, the swinging arm 40 rotates slightly clockwise in FIG. 8 about the second rotational axis P of the swinging arm 40.

Namely, with respect to the upper opening edge of the engaging opening 32, the swinging distal end portion 41 of the swinging arm 40 has the clearance S which is set to more than the amount of movement t2 at the engaging portion of the swinging arm 40 which moves in correspondence with the thickness t1 of the recording medium D, as described above. Therefore, the shutter members 30 at the open position are not interlocked with the rotation of this swinging arm 40.

Accordingly, when the inserted recording medium D is brought into contact with the insertion/rejection roller 42 and is transported, it is possible to reduce the risk of the insertion preventing portions 31 of the shutter members 30 moving toward the preventing position side by being interlocked with the slightly rotating swinging arm 40, and of interfering with the recording medium D being transported.

In addition, if the clearance S is much larger than the amount of movement t2 at the engaging portion of the swinging arm 40, even in a case where the thickness of the recording medium D has become thicker than the predetermined t1 due to a label attached to the recording medium D or dust or the like adhering thereto, it is possible to reduce the risk of the insertion preventing portion 31 moving toward the preventing position side and interfering with the recording medium D being transported.

Figure 9:
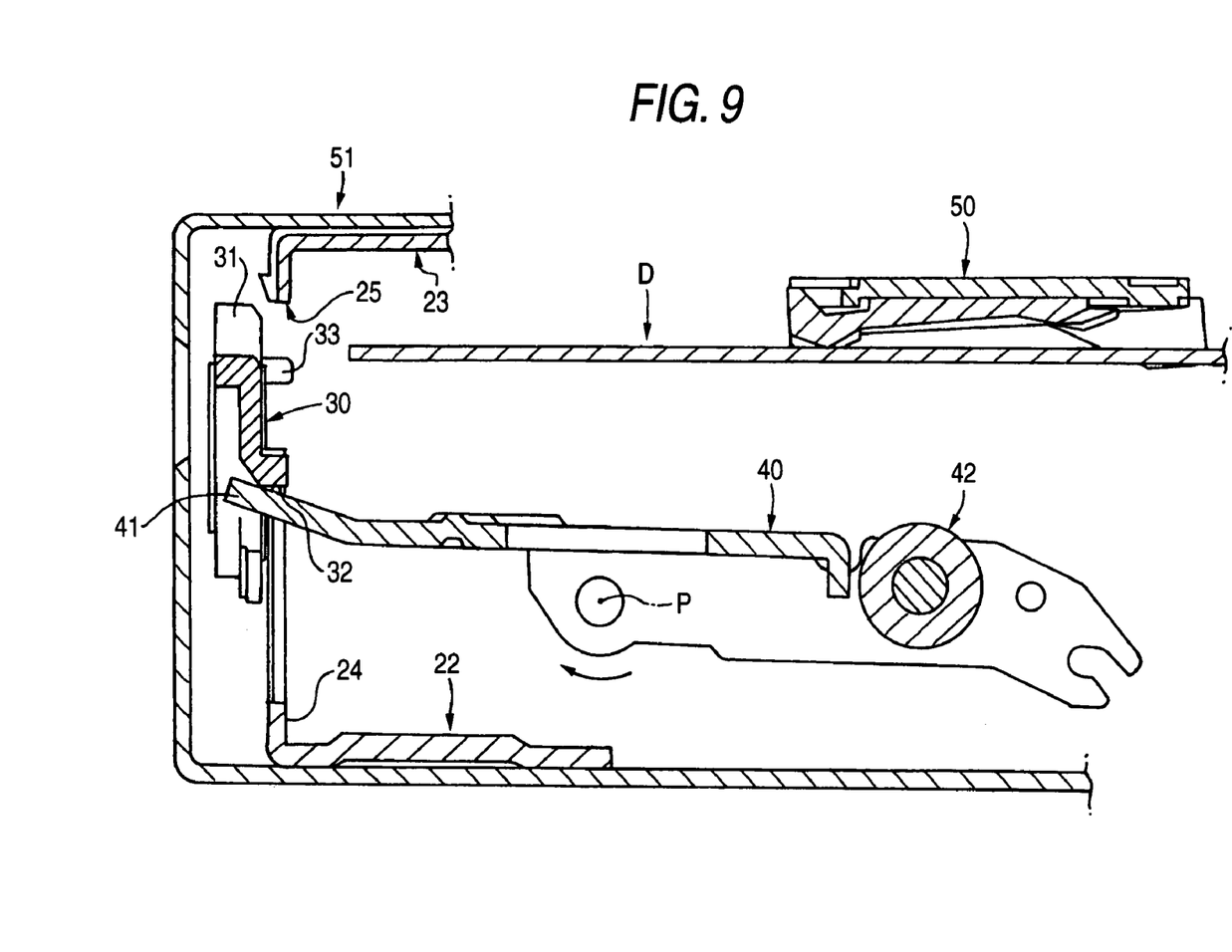
FIG. 9 is a diagram of the state of operation in FIG. 7.

Next, when the recording medium D is loaded in the recording/reproducing section, the swinging arm 40 assumes a horizontal attitude by being rotated clockwise about the second rotational axis P by the unillustrated drive unit, as shown in FIG. 9.

Figure 10:
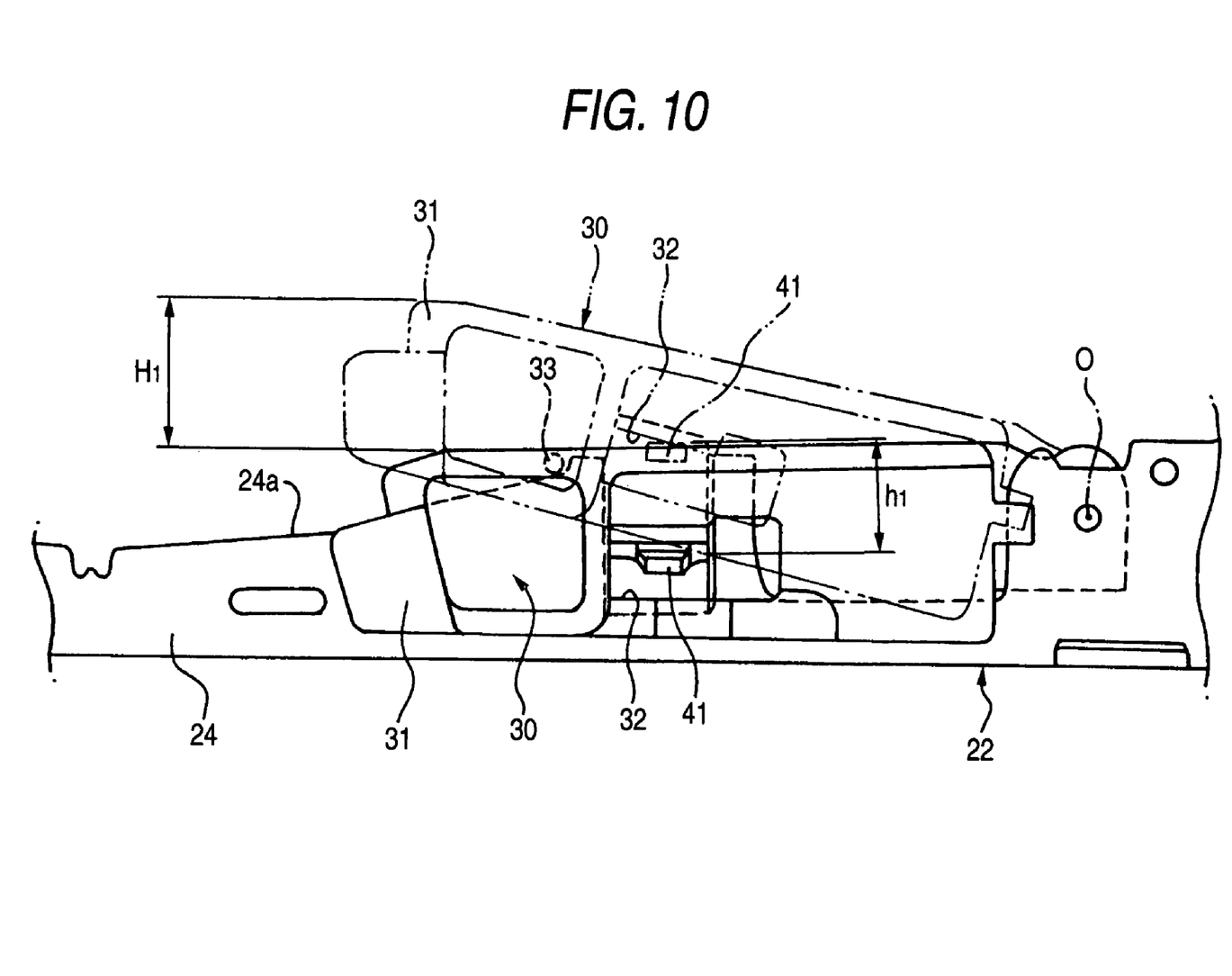
FIG. 10 is an enlarged front elevational view of essential portions of the shutter device shown in FIG. 5.

At this time, the shutter members 30, into the engaging openings 32 of which the respective swinging distal end portions 41 of the swinging arm 40 are inserted, are respectively rotated about the first rotational axis O by being interlocked with the rotation of the swinging arm 40. the shutter members 30 move to the preventing position, as shown by phantom lines in FIG. 10.

The shutter member 30 is rotated whereby the swinging distal end portion 41 of the swinging arm 40 is engaged in the engaging opening 32 formed between the first rotational axis O and the insertion preventing portion 31 in the shutter member 30. It is possible to save the space in the vicinity of the swinging arm 40 by making small the amount of movement (amount of displacement h1) of the swinging distal end portion 41 in the swinging arm 40 with respect to the amount of movement (amount of displacement H1) of the insertion preventing portion 31 by making use of the principle of the lever, as shown in FIG. 10. It is thereby possible to realize a compact size of the recording/reproducing apparatus.

Accordingly, even in a case where the dimension in the heightwise direction of the recording/reproducing apparatus (in the direction of a Z axis in FIG. 2) is limited in order to make the apparatus thin so that the amount of movement of the swinging distal end portion 41 in the swinging arm 40 cannot therefore be set large, the shutter device of this embodiment can enlarge the amount of movement of the shutter member 30 which moves between the open position and the preventing position. Since the shutter member 30 can retreat to the open position which is sufficiently spaced apart from the inserting/ejecting passage of the recording medium D, it is possible to widely set the opening width of the opening 25 (width in the Z-axis direction) for the insertion and ejection of the recording medium D.

Therefore, with the shutter device of the above-described embodiment, cases are eliminated in which the inserting/ejecting passage of the recording medium and the opening have become close and liable to interfere with each other, aggravating the feeling of inserting the recording medium or causing the recording medium and the opening portion to come into contact with each other.

When the recording medium D for which recording or reproduction has been completed is ejected from outside the housing 21 through the opening 25, the swinging arm 40 set in the horizontal attitude, as shown in FIG. 9, is rotated counterclockwise about the second rotational axis P by the unillustrated drive unit. The swinging arm 40 is thereby set in the forwardly inclined attitude, as shown in FIG. 8.

Then, the insertion/rejection roller 42 is rotatively driven by the unillustrated rotatively driving unit in a state in which the insertion/rejection roller 42 nips the recording medium D in cooperation with he guide member 50, so that the recording medium D can be ejected from outside the housing 21 through the opening 25.

Here, each shutter member 30 is constantly urged in the opening direction by the resiliency of the spring 35. The swinging distal end portion 41 of the swinging arm 40 inserted in the engaging opening 32 has the clearance S with respect to the upper opening edge of the engaging opening 32.

Accordingly, when the recording medium D is brought into contact with the insertion/rejection roller 42 and is transported toward the opening 25 side so as to be ejected, the shutter member 30 can be reliably positioned at the open position. Hence, it is possible to reduce the risk of causing interference between the shutter member 30 and the recording medium D due to a delay in the opening of the shutter member 30.

In addition, with the shutter device in this embodiment, the insertion/rejection roller 42 for inserting and ejecting the recording medium D is provided at the second end portion of the swinging arm 40 located on the opposite side to the swinging distal end portions 41 with the second rotational axis P located therebetween. The arrangement provided is such that when the swinging distal end portions 41 have moved the insertion preventing portions 31 of the shutter members 30 to the preventing position, the insertion/rejection roller 42 moves away from the recording medium D.

Namely, as the insertion/rejection roller 42 for inserting and ejecting the recording medium D is provided at the second end portion of the swinging arm 40, it is possible to make common the driving force at the time when the insertion preventing portion 31 moves to the preventing position and the driving force at the time when the insertion/rejection roller 42 moves away from the recording medium D. Hence, it is possible to realize a compact size of the overall apparatus and lower cost.

Furthermore, in a case where the positions of the opening 25 and the insertion/rejection roller 42 are predetermined, it is possible to make the swinging arm 40 compact. In addition, as the second rotational axis P is provided close to the engaging portion of the swinging arm 40, the amount of movement of the insertion/rejection roller 42 can be made large with respect to the amount of movement of the engaging portion of the swinging arm 40. Accordingly, the amount of movement of the insertion/rejection roller 42 away from the recording medium D can be made large.

The shapes and construction of the shutter members, the swinging arm, and the like in the shutter device of the invention are not limited to those of the shutter device in the above-described embodiment. It is possible to adopt various forms on the basis of the gist of the invention.

For example, although in the above-described embodiment the pair of left and right shutter members 30 are provided on the outer surface of the front panel 24, the shutter members 30 may be provided on the inner surface of the front panel 24. As for the shutter member, it suffices if at least one shutter member is provided. The first and second rotational axes O and P may be arranged not only in the directions respectively extending along the X axis and the Y axis but also in various directions.

In addition, it goes without saying that the structure of engagement between the shutter member and the swinging distal end portion of the swinging arm which is engaged between the first rotational axis and the insertion preventing portioning the shutter member is not limited to the arrangement of this embodiment in which the swinging distal end portion 41 is inserted in the engaging opening 32, and it is possible to adopt various forms.

Furthermore, the recording medium in the invention is not limited to a disk-shaped recording medium such as a CD or a DVD, and includes a card-shaped recording medium such as an optical memory card or a magnetic card.

In addition, the recording medium D and the insertion/rejection roller 42 which is a transporting member are not limited to those which abut against each other in the thicknesswise direction of the recording medium D. For example, the transporting member such as the insertion/rejection roller may abut against the recording medium D in the longitudinal direction (Y-axis direction) of the recording medium D.

Next, referring to FIG. 11, a description will be given of "between the position of the insertion preventing portion in the shutter member and a position which becomes symmetrical with the position of the insertion preventing portion with respect to the first rotational axis."

Figure 11:
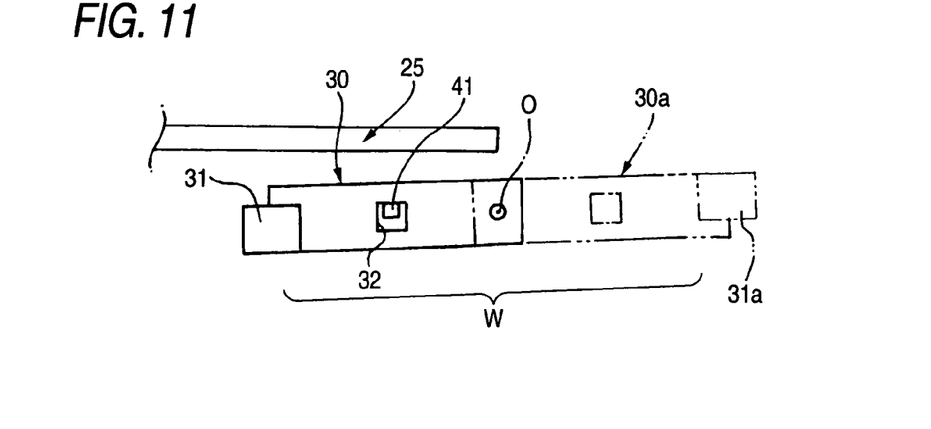
FIG. 11 is a schematic front elevational view of essential portions explaining an engaging portion in a shutter member of the invention.

As shown in FIG. 11, the symmetrical position with the insertion preventing portion 31 with respect to the first rotational axis O" is the position of an insertion preventing portion 31a of a shutter member 30a indicated by phantom lines in the drawing.

Accordingly, a region between the position of the insertion preventing portion 31 in the shutter member 30 and the position (the position of the insertion preventing portion 31a) which becomes symmetrical with the position of the insertion preventing portion 31 with respect to the first rotational axis O is a region indicated by W of FIG. 11.

Namely, although in the above-described embodiment, the engaging portions (the engaging opening 32 and the swinging distal end portion 41) of the shutter member 30 and the swinging arm 40 are provided between the first rotational axis O and the insertion preventing portion 31. The engaging portions are not limited to the above-described embodiment in the invention.

Figure 12:
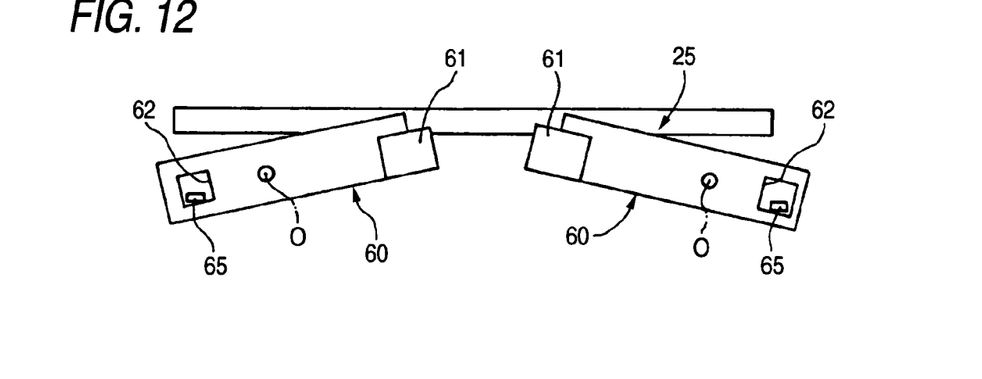
FIG. 12 is a schematic front elevational view illustrating a modification of the engaging portion in the shutter member of the invention.

For example, as shown in FIG. 12, there is a case where engaging portions (an engaging opening 62 and a swinging distal end portion 65) of a shutter member 60, which covers at least a portion of the opening 25, and the swinging arm are provided at a position which becomes symmetrical with an insertion preventing portion 61 with respect to the first rotational axis O (i.e., at a position on the opposite side of the insertion preventing portion 61 with the first rotational axis O located therebetween).

In this case, the moving direction of the insertion preventing portion 61 becomes opposite to the moving direction of the swinging distal end portion 65. Namely, even if the moving direction of the swinging arm 40 and the moving direction of the shutter member 30 are restricted due to such as a restriction imposed on the recording/reproducing apparatus, it is possible to cope with the situation by simply making adjustment of the engaging position.

Figure 13:
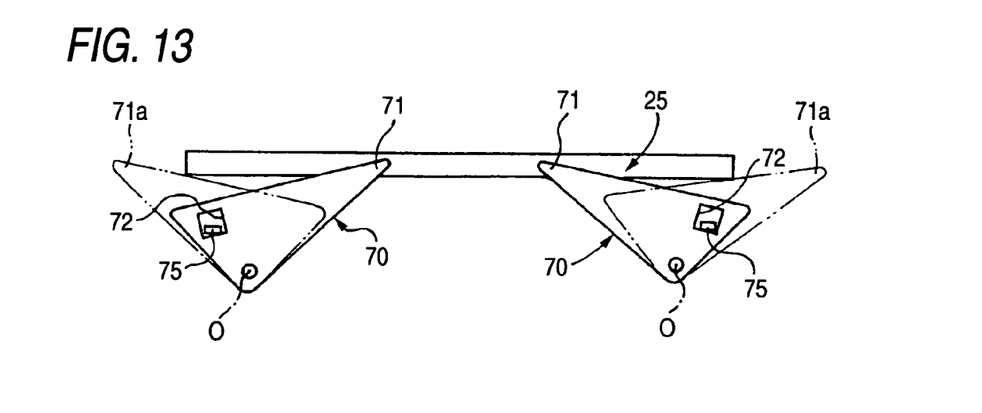
FIG. 13 is a schematic front elevational view illustrating another modification of the engaging portion in the shutter member of the invention.

In addition, as shown in FIG. 13, there are cases where engaging portions (an engaging opening 72 and a swinging distal end portion 75) of a shutter member 70, which covers at least a portion of the opening 25, and the swinging arm are provided at a position which assumes a triangular positional relationship with the first rotational axis O and an insertion preventing portion 71, and are provided between the position of the insertion preventing portion 71 and a position (the position of an insertion preventing portion 71a) which becomes symmetrical with the position of the insertion preventing portion 71 with respect to the first rotational axis O.

Thus, even if the shutter members have various shapes, it is possible to cope with them by simply making adjustment of the engaging position.

In addition, in a case where the engaging portions (the engaging opening 72 and the swinging distal end portion 75) and the rotational axis O are arranged side by side in the moving direction of the swinging distal end portion 75, the shutter member 70 can be driven if an arrangement is provided is such that the swinging distal end portion 75 is made to slide by virtue of the shape of the engaging opening 72 so as to prevent the rotational axis O and the swinging distal end portion 75 from being constantly arranged side by side in the moving direction of the swinging distal end portion.

The shutter device of the invention is comprised of the shutter member 30 which rotates about the first rotational axis O and the driving member such as a horizontally moving arm or the swinging arm 40 for driving the shutter member 30 by engaging the shutter member 30. The shutter member 30 has the insertion preventing portion 31 which, by being rotated by the driving member, is positioned at the preventing position for preventing the insertion of the recording medium D by covering at least a portion of the opening 25 for inserting or ejecting the recording medium D and at the open position enabling the insertion and ejection of the recording medium D by opening the opening 25. The engaging portions of the shutter member 30 and the driving member are provided between the position of the insertion preventing portion 31 in the shutter member 30 and a position which becomes symmetrical with the position of the insertion preventing portion 31 with respect to the first rotational axis O.

Namely, the engaging portions are provided between the position of the insertion preventing portion 31 in the shutter member 30 and a position which becomes symmetrical with the position of the insertion preventing portion 31 with respect to the first rotational axis O. It is possible to save the space in the vicinity of the driving member by making small the amount of movement of the driving member with respect to the amount of movement of the insertion preventing portion 31 of the shutter member 30 by making use of the principle of the lever. It is thereby possible to realize a compact size of the recording/reproducing apparatus.

What is claimed is:

1. A shutter device comprising:
    a shutter member which rotates around a rotational axis; and
    a driving member for driving the shutter member by engaging the shutter member, wherein
    the shutter member has an insertion preventing portion capable of being rotated by the driving member,
    the insertion preventing portion is positioned at a preventing position where the insertion preventing portion prevents an insertion of a recording medium by covering at least a part of an opening portion for inserting or ejecting the recording medium,
    the insertion preventing portion is positioned at an opening position where the insertion preventing portion is capable of inserting and ejecting the recording medium by opening the opening portion, and
    an engaging portion of the shutter member and the driving member is between the preventing position of the insertion preventing portion and a symmetrical position with the position of said insertion preventing portion with respect to the rotational axis.

2. The shutter device according to claim 1, wherein
    the driving member has a transporting member which inserts or ejects the recording medium by abutting against the recording medium, and
    the transporting member moves away from the recording medium while the insertion preventing portion moves to the preventing position from the open position.

3. The shutter device according to claim 2, wherein
    a clearance exists between the engaging portion of the shutter member and the driving member, when said insertion preventing portion is located in the open position, and
    the clearance is at least more than an amount of movement at the engaging portion of the driving member, when the transporting member abuts against the recording medium.

4. The shutter device according claim 1, wherein said shutter member is constantly urged in an opening direction.

* * * * *